United States Patent [19]

McCaffrey et al.

[11] Patent Number: 5,022,996
[45] Date of Patent: Jun. 11, 1991

[54] METHOD OF SEPARATING ORGANIC CONTAMINANTS FROM FLUID FEEDSTREAMS WITH POLYPHOSPHAZENE MEMBRANES

[75] Inventors: Robert R. McCaffrey, Milford, Mass.; Daniel G. Cummings, Idaho Falls, Id.

[73] Assignee: The United States of America as represented by the United States Department of Energy, Washington, D.C.

[21] Appl. No.: 516,400

[22] Filed: Apr. 30, 1990

[51] Int. Cl.$^5$ .............................................. B01D 6/14
[52] U.S. Cl. .................. 210/654; 210/500.27
[58] Field of Search .................. 210/500.27, 634, 644, 210/649–654; 55/16/158

[56] References Cited

U.S. PATENT DOCUMENTS 4,783,202 11/1988 Kraus et al. .................... 210/500.27

Primary Examiner—Frank Sever
Attorney, Agent, or Firm—James W. Weinberger; Thomas G. Anderson; William R. Moser

[57] ABSTRACT

A method is provided for separating halogenated hydrocarbons from a fluid feedstream. The fluid feedstream is flowed across a first surface of a polyphosphazene semipermeable membrane. At least one halogenated hydrocarbon from the fluid feedstream permeates through the polyphosphazene semipermeable membrane to a second opposed surface of the semipermeable membrane. Then the permeated polar hydrocarbon is removed from the second opposed surface of the polyphosphazene semipermeable membrane. Outstanding and unexpected separation selectivities on the order of 10,000 were obtained for methylene chloride when a methylene chloride in water feedstream was flowed across the polyphosphazene semipermeable membrane in the invented method.

18 Claims, 2 Drawing Sheets

METHOD OF SEPARATING ORGANIC CONTAMINANTS FROM FLUID FEEDSTREAMS WITH POLYPHOSPHAZENE MEMBRANES

CONTRACTUAL ORIGIN OF THE INVENTION

The United States Government has rights in this invention pursuant to Contract No. DE-AC07-76ID01570 between the United States Department of Energy and EG&G Idaho, Inc., the operator of the Idaho National Engineering Laboratory.

BACKGROUND OF THE INVENTION

The present invention relates to a method for removal of organic contaminants from contaminated air and water, and more specifically, to a method of separating halogenated hydrocarbons from fluid feedstreams with polyphosphazene membranes. Fluid feedstreams include both gas and liquid feedstreams.

Various purification techniques for removing organic contaminants from such feedstreams as ambient air, groundwater, or eluants from chemical processes, are known. Conventional air sparging and carbon adsorption techniques have been used to remove volatile organics from groundwater. The problems with both techniques are obvious, with air sparging merely distributing contaminants (albeit in lower concentrations) to the air, and carbon adsorption techniques generating large masses of now contaminated carbon, which in turn must be disposed.

Membrane separation has been used, for example, in the desalination of sea water and offers advantages of removing and collecting waste substantially in a single step and in a relatively small volume as compared to benign carbon from carbon adsorption techniques. However, many organic polymer membranes do not survive when exposed to organic solvents.

U.S. Pat. No. 4,170,204 provides examples of polyphosphazene membranes for the limited application of separating acid gases from gaseous mixtures containing nonacid gases, such as, gaseous hydrocarbons.

U.S. Pat. No. 4,749,489 issued June 7, 1988 and assigned to the present assignee discloses polyphosphazene membrane fabrication techniques and polyphosphazene membranes for the separation of selective components from a fluid feedstream.

An object of the present invention is to provide a new and improved method of separating organic contaminants from fluid feedstreams. It is a feature of this invention to have a membrane which permits rapid, selective separation of organic contaminants from feedstreams. An advantage of this invention is the one step process of simultaneously removing and collecting the contaminant in a relatively inexpensive and efficient manner compared to decontamination techniques found in the prior art.

Another object of the present invention is to provide an efficient and economical method for separating halogenated hydrocarbons from fluid feedstreams using a membrane. A feature of this invention is the recognition that the polyphosphazene membrane used is resistant to the harsh environments often found in environmental clean-up scenarios and recycling operations in chemical processes. As such, an advantage of this invention is the efficiency of the invented process in harsh environments.

Yet another object of the present method is to incorporate the pervaporation process in the removal of halogenated hydrocarbons from liquid feedstreams using a polyphosphazene semipermeable membrane. It is a feature of this process to exploit the affinity that the semipermeable membrane has for halogenated hydrocarbons, such as halogenated hydrocarbons, for example, methylene chloride, carbon tetrachloride and chloroform. The advantage confered in this process allows for separation of halogenated hydrocarbons from aqueous feedstreams in an efficient manner.

BRIEF SUMMARY OF THE INVENTION

In brief, the objects and advantages of the present invention are achieved by a method for separating polar hydrocarbons from a fluid feedstream. The fluid feedstream is flowed across a first surface of an polyphosphazene semipermeable membrane. At least one polar hydrocarbon from the fluid feedstream permeates through the polyphosphazene semipermeable membrane to a second opposed surface of the polyphosphazene semipermeable membrane. Then the permeated at least one polar hydrocarbon is removed from the second opposed surface of the polyphosphazene semipermeable membrane.

Halogenated hydrocarbons are separated from liquid feedstreams using a pervaporation process with a polyphosphazene membrane. The pervaporation process exploits the hydrophobic nature of the polyphosphazene membrane and the membrane's affinity for halogenated hydrocarbons. In accordance with a feature of the present invention, an outstanding and unexpected selectivity factor of 10,000 is attained when removing methylene chloride from a feedstream containing a methylene chloride and water mixture.

BRIEF DESCRIPTION OF THE DRAWINGS

The present invention together with the above and other objects and advantages may best be understood from the following detailed description of the embodiment of the invention illustrated in the drawings, wherein.

DETAILED DESCRIPTION OF THE PREFERRED EMBODIMENT

Figure 1:
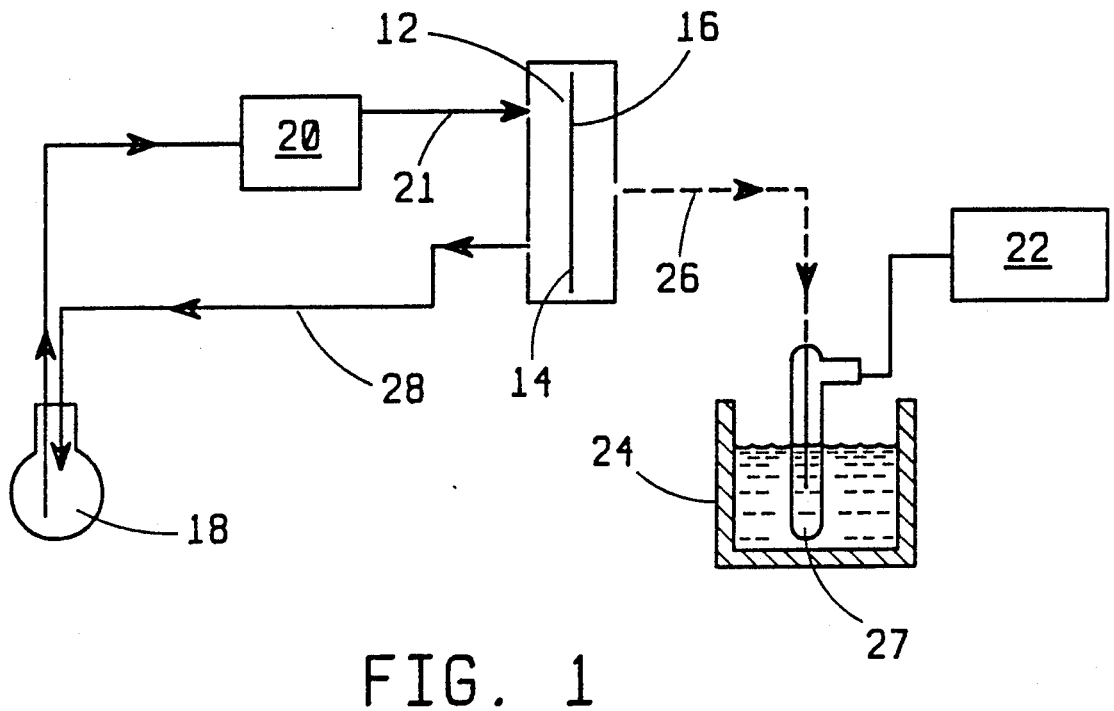
FIG. 1 is a schematic diagram of an exemplary apparatus for the phosphazene membrane separation process of the present invention.

Refering to FIG. 1, there is shown an apparatus generally designated by reference character 10 that can be used for the process of the present invention. It has been found that a purification method using an inorganic semipermeable membrane, such as a polyphosphazene membrane 12 exhibits high separation selectivities when isolating halogenated hydrocarbons from gas and liquid feedstreams. Polyphosphazene membranes that can be used for the polyphosphazene membrane 12 are described in the above-mentioned U.S. Pat. No. 4,749,489. The disclosure of U.S. Pat. No. 4,749,489 is incorporated herein by reference.

This process of separating out halogenated compounds exploits the affinity that phenoxy-substituted phosphazenes, as shown by the formula below, have for halogenated hydrocarbons.

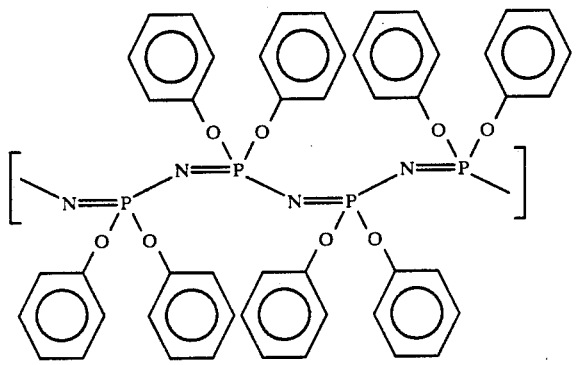

This halogenated hydrocarbon affinity was displayed in both gas and liquid feedstream filtration experiments utilizing the process of the present invention. Generally, a feedstream 18, such as groundwater, stack emissions, chemical waste streams, or other such sources, is routed to a pump 20 to be pressurized. A pressurized feedstream 21 is then flowed across a first, upstream surface 14 of the membrane 12 whereby selected constituents 26 of the feedstream permeate to a second, opposed surface 16 of the membrane 12 while the now purified feedstream 28 is recycled back to the environment, chemical process, or the like. Permeated vapors or gases 26 can be siphoned directly off via a vacuum device 22 placed downstream to the membrane 12, or condensed into liquid 27 by incorporating a condensation chamber 24 in the process 10.

In either the gas or liquid separation process, a chemical and/or pressure gradient, incorporating the principle of Le Chatelier, is maintained through the membrane 12 from high pressure at the upstream surface 14 of the membrane 12 to low pressure at the opposed downstream surface 16 of the membrane 12 so as to facilitate membrane permeation of feedstream contaminants 26. High pressure at the upstream side 14 of the membrane is maintained by pressurizing the fluid feedstream 18 with the pump 20 or similar device, while a relatively lower pressure is maintained on the downstream surface 16 of the membrane 12 by the use of the vacuum device, 22, a purging gas such as helium, a reactor to remove the gaseous downstream permeate 26 or a condensation device 24 such as a liquid nitrogen trap, to condense the gaseous permeate 26 to liquid 27.

In a gas permeation experiment, the feed gas mixture was pressurized and flowed across the upstream surface 14 of the membrane 12. The feed gas mixture was pressurized to 1 to 3 atmospheres. The rate of flow across the membrane was 3 ml/min. The membrane area was 17.4 square centimeters and 2–10 microns thick. A helium purge gas was used on the downstream side 16 of the membrane 12 to remove any gas 26 that permeates the membrane 12. While the purge gas maintains a constant concentration gradient during the test, an actual process would utilize either vacuum/condensation or a reactor to remove the permeated hydrocarbon. A typical vacuum pull on the system is 450 mm Hg. Analysis of the feedstream 18, the purified feedstream 28, and downstream permeate gases 26 were performed by gas chromatography. The results of the gas permeation experiment conducted with chlorinated hydrocarbon gas mixtures are summarized in FIG. 2. The y-axis is logarithmic in the graph shown.

Figure 2:
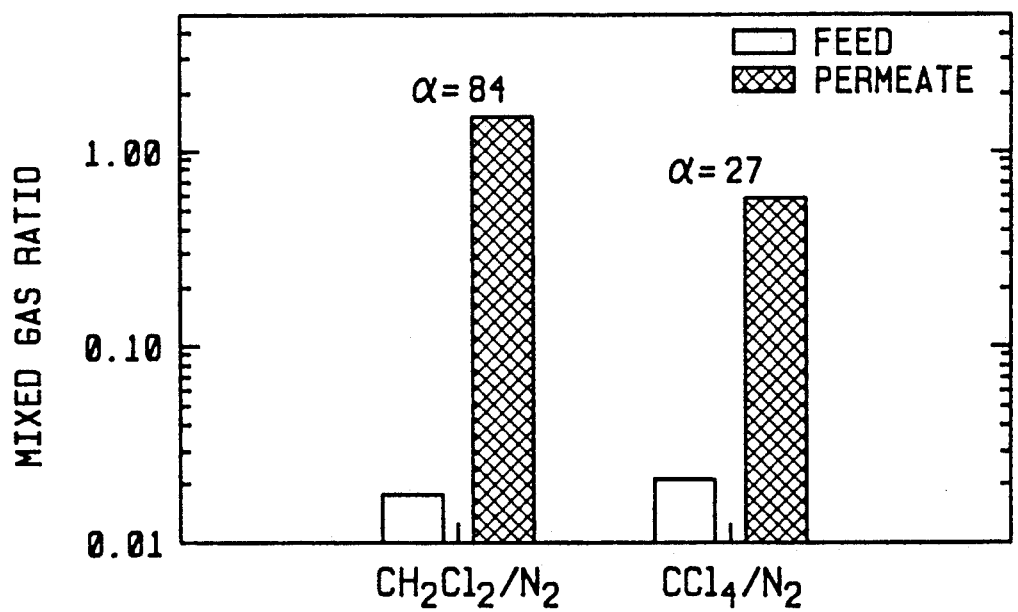
FIG. 2 is a graph showing separation selectivities, designated as $\alpha$, of methylene chloride and carbon tetrachloride separated from a nitrogen gas feedstream.

High chlorinated hydrocarbon/nitrogen ratios were observed in the permeate stream for the gas mixtures evaluated, indicating a good membrane affinity for chlorinated hydrocarbons. As shown in FIG. 2, the selectivities for separation of methylene chloride and carbon tetrachloride from nitrogen were 84 and 27, respectively. Separation selectivities, considered as measurements of membrane efficiencies and designated as $\alpha$, were calculated using the equation for binary gas mixtures; i.e., by dividing the downstream permeate 26 constituent ratios by the upstream feed 18 constituent ratios. The value $\alpha$ at the top of each bar graph in FIG. 2 is the selectivity value displayed by each compound. FIG. 2 shows that a high separation efficiency, or membrane selectivity, was obtained with the methylene chloride gas mixture. And although the carbon tetrachloride selectivity is lower, due to its decreased polarity, a good separation is present, indicating that the feasibility of separating these chlorinated hydrocarbon gases, particularly polar hydrocarbons, from nitrogen is good. These results are consistent with earlier studies which indicated that the polyphosphazene membrane has a higher affinity for polar gases than nonpolar gases. Tests were also run as a function of pressure, 70–700 kPa. Little change in separation selectivities were observed.

Figure 3:
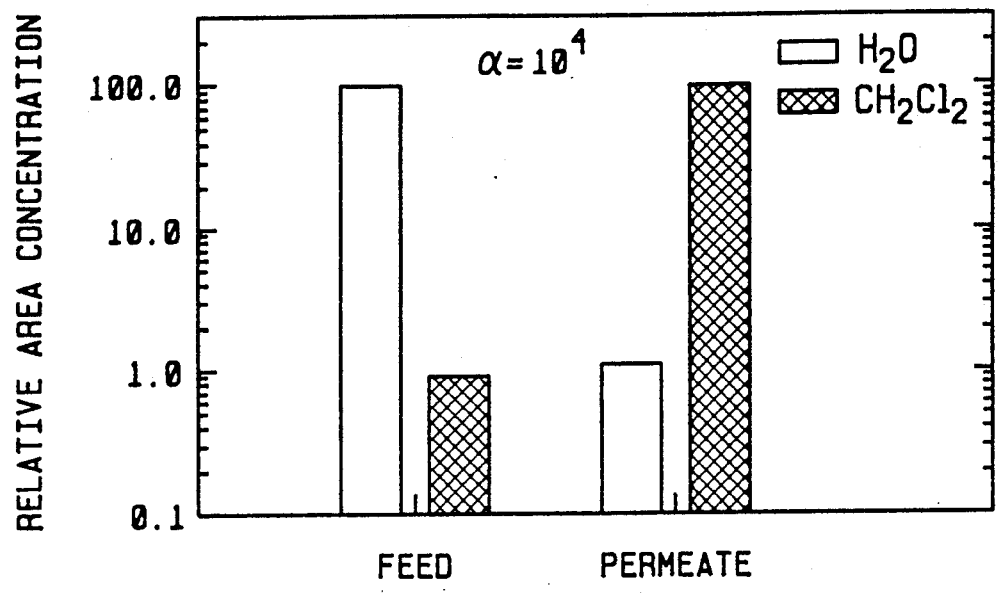
FIG. 3 is a graph showing separation selectivities for methylene chloride from water via pervaporation.

Another separation application is the removal of chlorinated hydrocarbons from water by using a membrane pervaporation technique. This technique uses a liquid feedstream on one side of the membrane and a vacuum on the other. As such, an experiment, shown in FIG. 1, utilizing water contaminated with methylene chloride as a feedstream 18 and a vacuum 22 on the downstream side 16 of the membrane 12 was performed using the pervaporation technique. On the upstream side 14 of the membrane 12 a mixture of liquids was circulated, and on the opposing, downstream side 16 of the membrane 12, a low pressure gas was maintained. While not essential, the feedstream 18 can be the pressurized feedstream 21 at about 7 atmospheres. The rate of flow of the feedstream 18 was 25 ml/min. The membrane area was 13.8 square centimeters and 3 microns thick. Volatile molecules permeated through the membrane 12 and entered the low pressure gas as a vapor 26 while the remaining liquid solvent 28 was rejected by the membrane. Experiments were performed using a one percent methylene chloride in water mixture. Permeated methylene chloride vapors 26 were condensed 27 on the downstream side 16 of the membrane 12 with a liquid nitrogen trap 24 and analyzed by gas chromatography. An outstanding and unexpected selectivity factor on the order of 10,000 was obtained in these experiments. Results are shown in FIG. 3. The y-axis is logarithmic in the graph shown.

Figure 4:
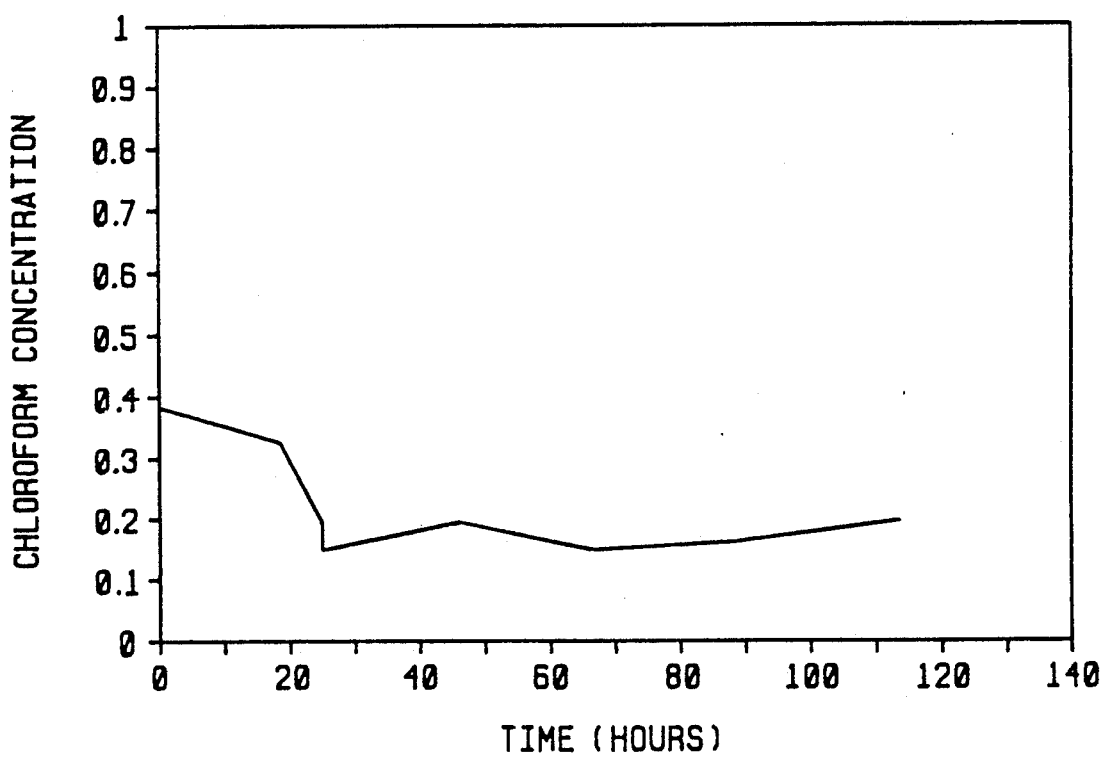
FIG. 4 is a graph showing chloroform concentration in a feedstream relative to time that has been subjected to the phosphazene membrane separation process.

In another experiment, a mixture of chloroform (0.34%) and methylene chloride (0.25%) was mixed with water and subjected to the purification process. This membrane ran for 322.5 hours at room temperature. The rate of flow across the membrane was 25 ml/min. The membrane area was 13.8 square centimeters and 2.0 microns thick. The vacuum pulled on the system was 450 mm Hg. Gas chromatographic analysis of the permeate revealed a 10.3% concentration of chloroform. Conversely, on the upstream side 14 of the membrane 12, the concentration of chloroform in the purified feedstream 28 dropped to approximately 0.2%, as shown in FIG. 4.

While the invention has been described with reference to details of the illustrated embodiment, these details are not intended to limit the scope of the invention as defined in the appended claims.

The embodiment of the invention in which an exclusive property or privilege is claimed is defined as follows:

1. A method for separating halogenated hydrocarbons from a fluid feedstream comprising:
   flowing the fluid feedstream across a first surface of a polyphosphazene semipermeable membrane; whereby
   at least one halogenated hydrocarbon from the fluid feedstream is permeated through said membrane to a second opposed surface of said polyphosphazene semipermeable membrane; and
   removing said permeated halogenated hydrocarbon from said second opposed surface of said semipermeable membrane.

2. A method as recited in claim 1 wherein said polyphosphazene semipermeable membrane is comprised of poly[bis(phenoxy)phosphazene] having the formula:

3. A method as recited in claim 2 wherein fluid feedstream is pressurized and then flowed across said first surface of said polyphosphazene semipermeable membrane.

4. A method as recited in claim 2 wherein said second surface of said polyphosphazene membrane is exposed to pressures lower than those applied to the first surface of said polyphosphazene membrane.

5. A method as recited in claim 2 wherein a low pressure is applied to said second opposed surface of said polyphosphazene semipermeable membrane and said permeated at least one halogenated hydrocarbon is condensed.

6. A method as recited in claim 2 wherein the fluid feedstream is a liquid feedstream and a vacuum is applied to said second opposed surface of said polyphosphazene semipermeable membrane and said permeated at least one halogenated hydrocarbon is condensed.

7. A method as recited in claim 1 wherein said halogenated hydrocarbon is chlorinated.

8. A method as recited in claim 1 wherein said halogenated hydrocarbon is methylene chloride.

9. A method as recited in claim 8 providing a selectivity value $\alpha$ of about 10,000.

10. A method as recited in claim 1 wherein said halogenated hydrocarbon is carbon tetrachloride.

11. A method as recited in claim 1 wherein said halogenated hydrocarbon is chloroform.

12. A method for separating halogenated hydrocarbons from a liquid feedstream comprising:
    flowing the liquid feedstream across a first surface of a polyphosphazene membrane;
    maintaining a lower pressure relative to said first surface on a second opposed surface of said inorganic semipermeable membrane;
    permitting at least one halogenated hydrocarbon from the liquid feedstream to permeate through said polyphosphazene membrane to said second opposed surface of said polyphosphazene membrane; and
    removing said permeated at least one halogenated hydrocarbon from said second opposed surface of said inorganic semipermeable membrane.

13. A method as recited in claim 12 wherein the liquid feedstream is pressurized.

14. A method as recited in claim 12 wherein the removed said permeated at least one halogenated hydrocarbon is condensed.

15. A method as recited in claim 12 wherein the removed said permeated at least one halogenated hydrocarbon is carbon tetrachloride.

16. A method as recited in claim 12 wherein the removed said permeated at least one halogenated hydrocarbon is chloroform.

17. A method as recited in claim 12 wherein the removed said permeated at least one halogenated hydrocarbon is methylene chloride.

18. A method as recited in claim 12 wherein said polyphosphazene membrane is composed of poly[bis(phenoxy)phosphazene] having the formula:

* * * * *